United States Patent
Chouman et al.

(10) Patent No.: US 12,124,425 B2
(45) Date of Patent: Oct. 22, 2024

(54) STREAM-BASED DATABASE ALTERATION ARCHITECTURE AND METHODS FOR MANAGING DATABASES

(71) Applicant: Capital One Services, LLC, McLean, VA (US)

(72) Inventors: Andrew Chouman, Seattle, WA (US); Chih-Hsiang Chow, Coppell, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 160 days.

(21) Appl. No.: 17/957,057

(22) Filed: Sep. 30, 2022

(65) Prior Publication Data
US 2024/0111748 A1    Apr. 4, 2024

(51) Int. Cl.
*G06F 16/23* (2019.01)
*G06F 16/27* (2019.01)
*H04L 9/40* (2022.01)

(52) U.S. Cl.
CPC ............ *G06F 16/23* (2019.01); *G06F 16/273* (2019.01); *H04L 63/045* (2013.01)

(58) Field of Classification Search
CPC ....... G06F 16/23; G06F 16/273; H04L 63/045
See application file for complete search history.

(56) References Cited

U.S. PATENT DOCUMENTS

| | | | |
|---|---|---|---|
| 7,519,835 B2 | 4/2009 | Koyfman | |
| 8,001,389 B2 | 8/2011 | Dettinger et al. | |
| 9,087,212 B2 | 7/2015 | Balakrishnan et al. | |
| 2020/0349580 A1* | 11/2020 | Gerling-Ospina | G06Q 20/42 |
| 2021/0014061 A1* | 1/2021 | Bharatam | H04L 9/3218 |

* cited by examiner

*Primary Examiner* — Apu M Mofiz
*Assistant Examiner* — Cindy Nguyen
(74) *Attorney, Agent, or Firm* — TROUTMAN PEPPER HAMILTON SANDERS LLP; Christopher J. Forstner; John A. Morrissett

(57) ABSTRACT

Systems and methods for providing stream-based database alteration architecture are disclosed. The systems and methods can receive a plurality of client tracking identification numbers in a data stream from a database via a communication network, wherein the plurality of client tracking identification numbers comprises customer metadata. The received plurality of client tracking identification numbers is assigned to one or more virtual consumer processors for encrypting or decrypting a client record associated with each of the plurality of received client tracking identification numbers. The client record associated with each of the received plurality of client tracking identification numbers is encrypted or decrypted. A database is updated to indicate the client record associated with each of the received plurality of client tracking identification numbers is encrypted or decrypted using the assigned one or more virtual consumer processors.

19 Claims, 6 Drawing Sheets

CLIENT IDENTIFICATION NUMBERS

STREAM-BASED DATABASE ALTERATION ARCHITECTURE AND METHODS FOR MANAGING DATABASES

FIELD

The present disclosure relates generally to systems and methods for managing one or more databases and, more particularly, for providing a stream-based database alteration architecture.

BACKGROUND

Typically, a single processor updates the functionality of a database. Unfortunately, this technique consumes a lot of processing time and cycles, and therefore starves the other processes that are waiting to use the same processor. This starvation causes delay in the execution of other processes and results in undesirable delay to the user. Furthermore, if multiple databases are updated at the same time, multiple processors must be enlisted to handle the task.

BRIEF SUMMARY OF THE INVENTION

The present disclosure describes systems and methods that provide stream-based database alteration architecture. The system can be configured to receive a plurality of client tracking identification numbers in a data stream from a database via a communication network in a JavaScript Object Notation (JSON) format, wherein the plurality of client tracking identification numbers comprises customer metadata. The system can also be configured to determine a required number of one or more virtual consumer processors to encrypt or decrypt a client record associated with each of the received plurality of client tracking identification numbers. The system can also be configured to identify a current number of one or more available virtual consumer processors to encrypt or decrypt the client record associated with each of the received plurality of client tracking identification numbers. When the identified current number of one or more available virtual consumer processors is greater than or equal to the required number of the one or more virtual consumer processors, the system can also be configured to divide the received plurality of client tracking identification numbers and assign the divided received plurality of client tracking identification numbers between the one or more available virtual consumer processors, based on an operating capacity of the one or more available virtual consumer processors; retrieve the client record associated with each of the plurality of client tracking identification numbers from a client database; encrypt or decrypt the retrieved client record in the client database using the assigned one or more available virtual consumer processors; and update the database to indicate the client record associated with each of the plurality of client tracking identification numbers is encrypted or decrypted using the assigned one or more available virtual consumer processors.

Other aspects of the systems and methods described herein can include creating one or more new virtual consumer processors when the identified current number of one or more available virtual consumer processors is less than the required number of the one or more virtual consumer processors. The system can also be configured to delete the one or more available virtual consumer processors upon updating the database to indicate the client record associated with each of the plurality of client tracking identification numbers is encrypted or decrypted using the assigned one or more available virtual consumer processors. The system can be configured to determine when there is an error from the assigned one or more available virtual consumer processors during the encrypting or decrypting the retrieved client record in the client database.

Other aspects of the systems and methods described herein can include identifying one or more existing available virtual consumer processors for encrypting or decrypting the retrieved client record in the client database when the error is determined; and assign the identified one or more existing available virtual consumer processors for encrypting or decrypting the retrieved client record in the client database. The system can also be configured to create one or more new virtual consumer processors for encrypting or decrypting the retrieved client record in the client database when the error is determined; and assign the created one or more new virtual consumer processors for encrypting or decrypting the retrieved client record in the client database.

The present disclosure describes systems and methods that provide stream-based database alteration architecture. The system can be configured to assign a plurality of received client tracking identification numbers to one or more available virtual consumer processors for encrypting or decrypting a client record associated with each of the plurality of received client tracking identification numbers, based on operating capacity of the one or more available virtual consumer processors. The system can also be configured to determine whether there is an error from the assigned one or more available virtual consumer processors during the encrypting or decrypting of the client record associated with each of the plurality of received client tracking identification numbers. When the error is determined from the assigned one or more available virtual consumer processors during the encrypting or decrypting of the client record associated with each of the plurality of received client tracking identification numbers, the system is configured to identify at least one new virtual consumer processor to assign the encrypting or decrypting of the client record associated with each of the plurality of received client tracking identification numbers. Additionally, the system is configured to assign the encrypting or decrypting of the client record associated with each of the plurality of received client tracking identification numbers to the identified at least one new virtual consumer processor. Furthermore, the system is also configured to complete the encrypting or decrypting of the client record associated with each of the plurality of received client tracking identification numbers using the assigned at least one new virtual consumer processor. The system is also configured to update a database to indicate the client record associated with each of the plurality of received client tracking identification numbers is encrypted or decrypted using the assigned at least one new virtual consumer processor.

The present disclosure also describes a system that provides stream-based database alteration architecture. The system is configured to receive a plurality of client tracking identification numbers in a data stream from a database via a communication network, wherein the plurality of client tracking identification numbers comprises customer metadata. The system is further configured to assign the received plurality of client tracking identification numbers to one or more virtual consumer processors for encrypting or decrypting a client record associated with each of the plurality of received client tracking identification numbers. The system is also configured to encrypt or decrypt the client record associated with each of the received plurality of client tracking identification numbers. The system is configured to update a database to indicate the client record associated with each of the received plurality of client tracking identification numbers is encrypted or decrypted using the assigned one or more virtual consumer processors.

These and other aspects of the present disclosure are described in the Detailed Description below and the accompanying figures. Other aspects and features of examples of the present disclosure will become apparent to those of ordinary skill in the art upon reviewing the following description of specific, examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while examples can be discussed below as device, system, or method examples, it is to be understood that such examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings:

FIG. 4 is an exemplary block diagram of illustrating the client identification numbers, according to an example implementation of the disclosed technology;

DETAILED DESCRIPTION

Examples of the present disclosure generally include systems and methods for providing stream-based database alteration architecture. Particularly, the disclosed technology uses multiple virtual processors to perform the alteration of the database thereby efficiently and effectively using the computing resources. Furthermore, the disclosed technology also provides a fail proof approach to modifying the database where a new virtual processor takes over the modification of the database when one of the virtual processor fails.

Reference will now be made in detail to examples of the disclosed technology, examples of which are illustrated in the accompanying drawings and disclosed herein. Wherever convenient, the same reference numbers will be used throughout the drawings to refer to the same or like parts.

Figure 1:
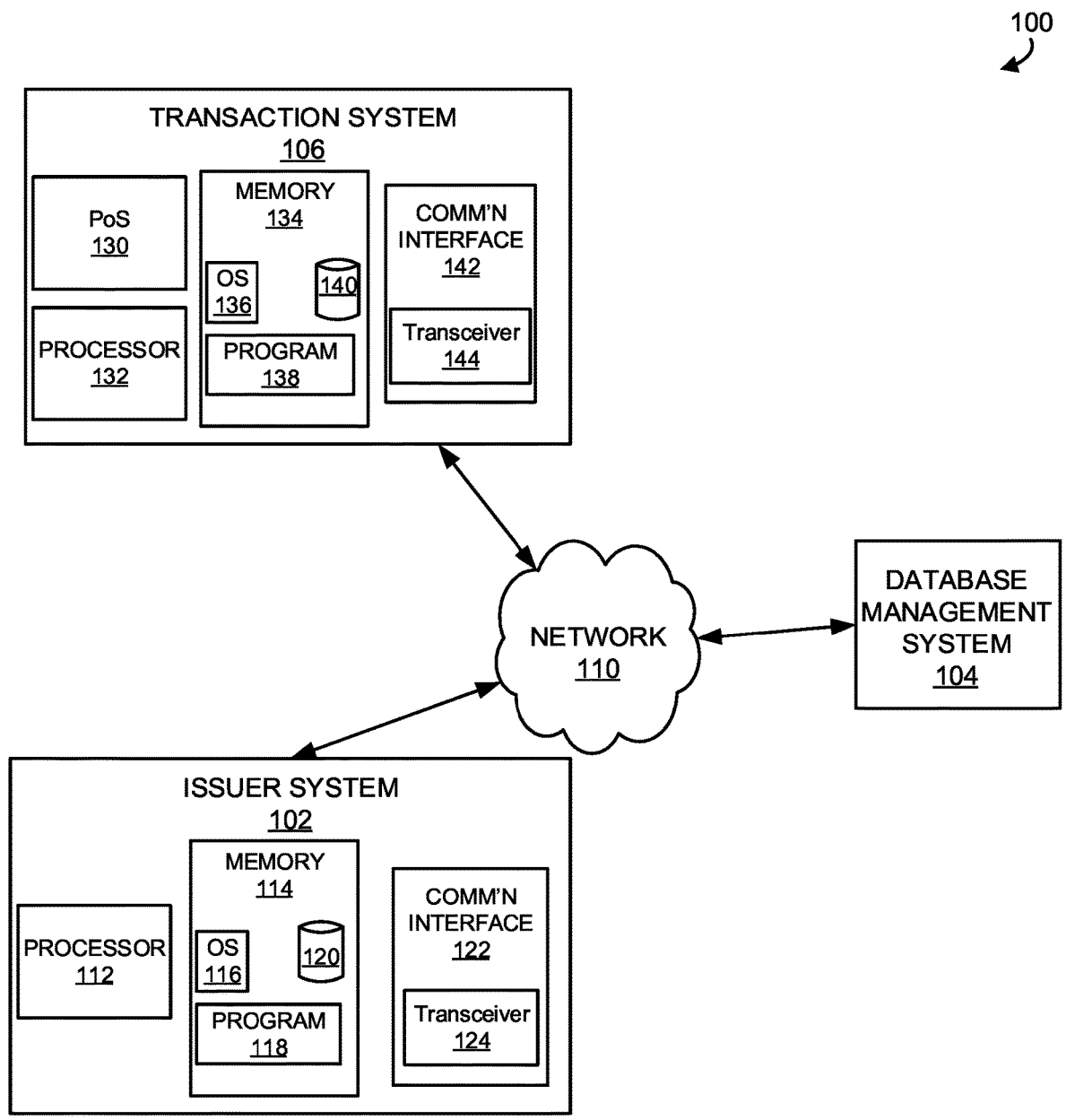
FIG. 1 is a diagram of an example system environment that can be used to implement one or more examples of the present disclosure.

FIG. 1 is a diagram of an example system environment 100 environment that can be used to implement one or more examples of the present disclosure. A more detailed explanation of the components of the system environment 100 is provided below. It is beneficial, however, to provide a brief overview to describe the components of the systems and methods for providing stream-based database alteration architecture. The system environment 100 can include an issuer system 102. The issuer system 102 can be associated with financial institution that issues a credit card, manages customers' accounts, and provides points for transactions completed with the credit card or line of credit. As described above, it is contemplated that the database management system 104 assists with providing stream-based database alteration architecture described herein It will be understood, however, that when reference is made herein to the issuer system 102 completing a task or process, another entity can equally perform the task or processes for the issuer system 102.

The issuer system can communicate over a network 110 with a transaction system 106. The transaction system can be associated with entities that provide goods or services for a fee. The customer can, for example, complete a transaction at the transaction system 106 (e.g., at a point of sale (PoS) device), and the transaction information can be relayed to the issuer system 102 for processing. After processing the transaction, the issuer system 102 can allocate a number of points to the particular transaction, as will be appreciated.

Figure 2:
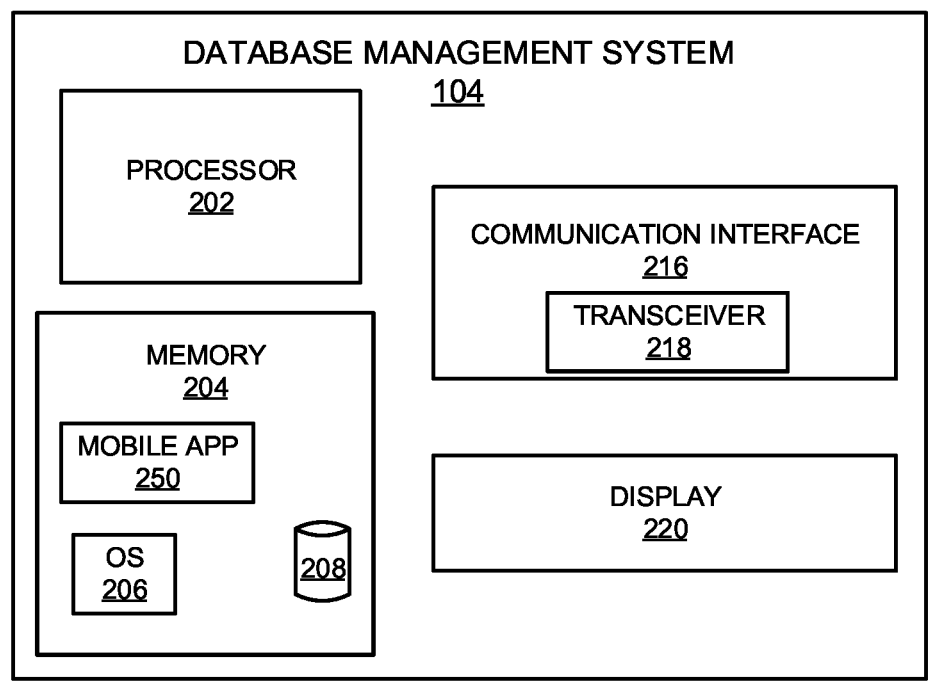
FIG. 2 is a component diagram of an example database management system, according to an example implementation of the disclosed technology.

The system environment 100 can also include a database management system 104. FIG. 2 is a component diagram of an example database management system 104, according to the present disclosure. The device 104 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The device 104 can include a processor 202 and a memory 204, operating system ("OS") 206, one or more programs (e.g., a mobile application 250), and/or data storage 208. The device 104 can also include a communication interface 216 that includes a transceiver 218. The communication interface 216 and/or transceiver 218 can be used to transmit and/or receive the data described throughout this disclosure, including for example the requests to provide stream-based database alteration architecture. The device 104 can include a display 220. The display 220 can provide visual representation of the applications (e.g., mobile application 250) and/or graphical user interfaces (GUIs) associated with those applications.

The processor 202 within the database management system 104 may execute one or more computer-executable instructions stored in memory 204 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®). In this example, the processor 202 may execute one or more virtual processors. A virtual processor is a representation of a physical processor core to the operating system 206 of a logical partition that uses shared processors.

The memory 204 within the database management system 104 comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 204 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 204 that may be executed by the processor 202 and/or may be implemented by configured logic in the optional configurable.

Figure 3:
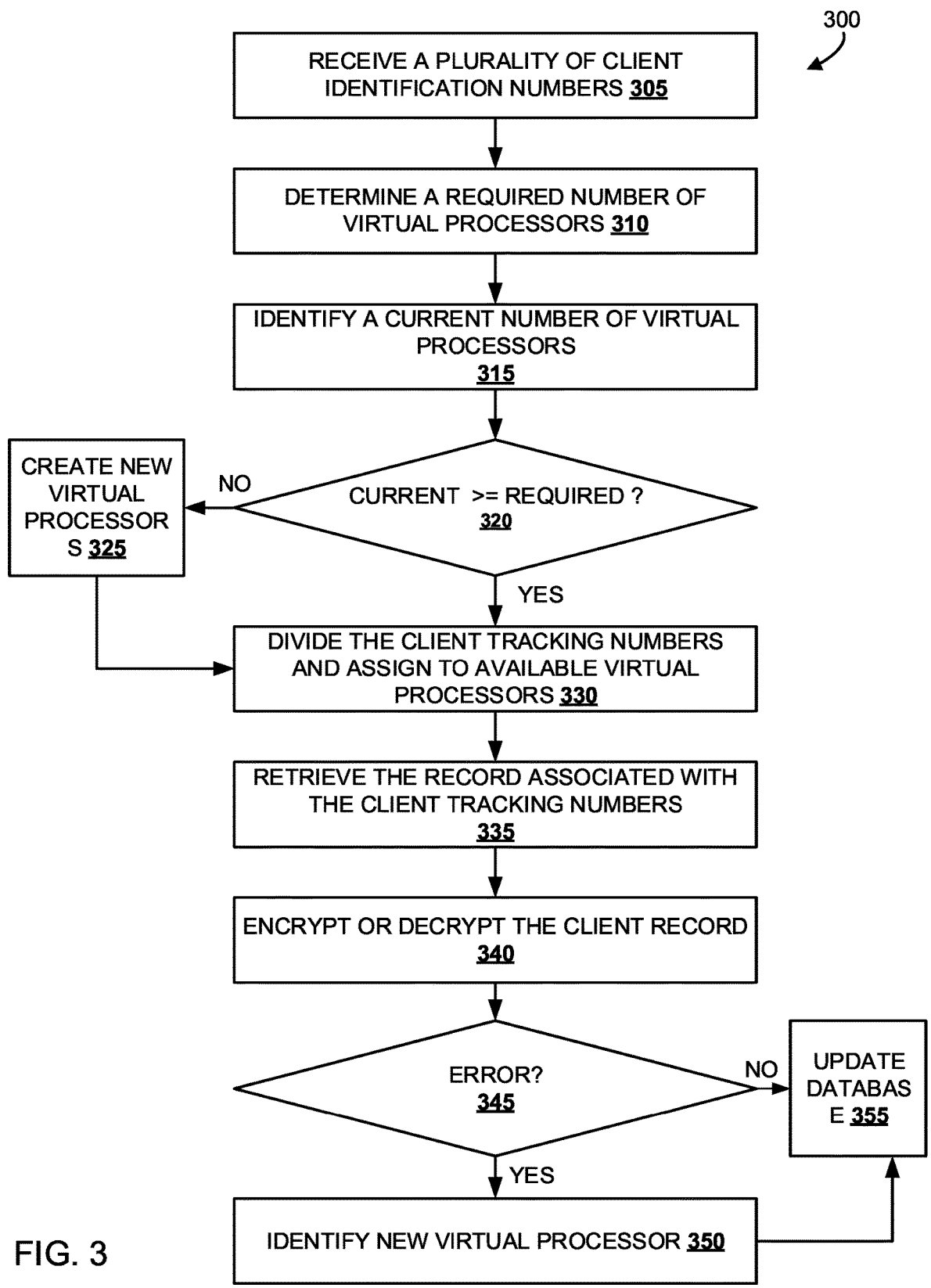
FIG. 3 is a flowchart of a method for providing stream-based database alteration architecture, according to an example implementation of the disclosed technology.

FIG. 3 is a flowchart of an example process 300 for performing stream-based database alteration, according to the present disclosure. Process 300 can be performed in whole or in part by the components of the database management system 104, for example processor 202, memory 204, operating system ("OS"), the transceiver 218, and the like. Process 300 can include receiving 305 a plurality of client identification numbers. By way of example, the client identification numbers can include a combination of alphanumeric characters, although the client identification numbers can include other types or amounts of information. An example of the client identification numbers 400 that is received is illustrated in FIG. 4. While the example illustrated in FIG. 4 includes the client identification numbers 400 in all numbers, other examples of the client identification numbers can include only alphabets, alphanumeric characters, or special characters, or any combination thereof. Additionally, in this example, the client identification numbers that is received is in a JavaScript Object Notation (JSON) format, although the client identification numbers that are received can be in other standard formats. As it would be appreciated by a person will ordinary skill in the art, JSON is a standard text-based format for representation structured data based on JavaScript object syntax. It is commonly used for transmitting data in web applications.

Next in step 310, the database management system 104 determines a required number of virtual processors required to process the received client identification numbers based on the number of client identifications numbers received, current operating capacity of the virtual processors, anticipated or expected consumption of the virtual processors, although the database management system 104 can determine the required number of virtual processors based on other parameters. In this example, a virtual processor is a representation of a physical processor core to the operating system of a logical partition that uses shared processors. In the present disclosure, when an operating system 206 is install and run on the database management system 104 that is not partitioned, the operating system 206 calculates the number of operations that it can perform concurrently by counting the number of processors on the server.

For example, if an operating system 206 on the database management system 104 has eight processors, and each processor can perform two operations at a time, the operating system 206 can perform 16 operations at a time. In the same way, when the operating system 206 on a logical partition that uses dedicated processors, the operating system 206 calculates the number of operations that it can perform concurrently by counting the number of dedicated processors that are assigned to the logical partition. In both cases, the operating system 206 can easily calculate how many operations it can perform at a time by counting the whole number of processors that are available to it. However, when the operating system 206 is installed and run on a logical partition that uses shared processors, the operating system cannot calculate a whole number of operations from the fractional number of processing units that are assigned to the logical partition. The operating system 206 in the database management system 104 must therefore represent the processing power available to the operating system 206 as a whole number of processors. This allows the operating system to calculate the number of concurrent operations that it can perform. Accordingly, the virtual processor is a representation of a physical processor 202 to the operating system 206 of a logical partition that uses shared processors. Further, in this example, the operating system 206 within the database management system 104 distributes processing units evenly among the virtual processors assigned to a logical partition. For example, if a logical partition has 1.80 processing units and two virtual processors, each virtual processor has 0.90 processing units supporting its workload.

Figure 5:
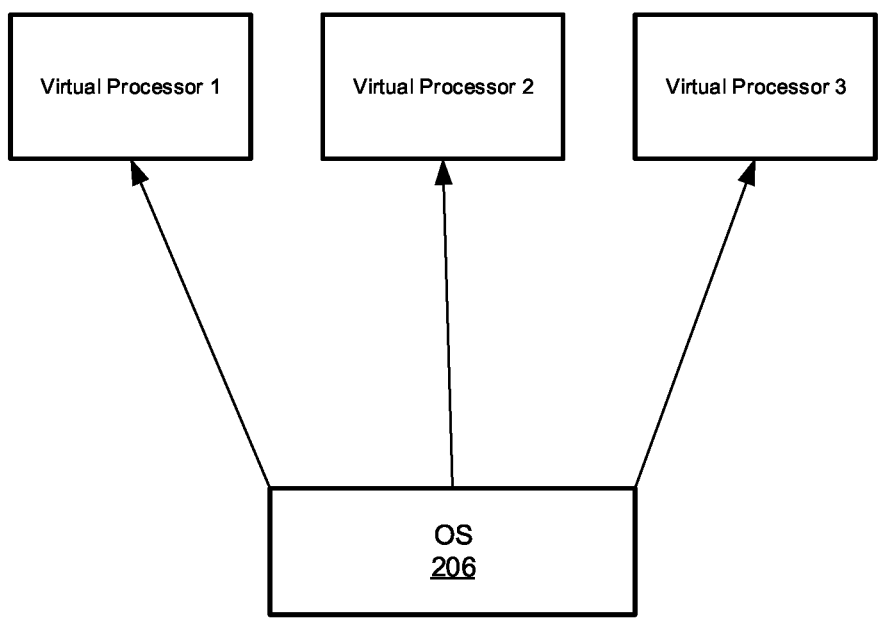
FIG. 5 is an exemplary block diagram illustrating a virtual processor, according to an example implementation of the disclosed technology.

Next, in step 315, the database management system 104 identifies the current number of virtual processors that are available for processing the received client identification numbers. In this example, the operating system 206 within the database management system 104 includes a count of total number of virtual processors that are currently executing and out which, a number of virtual processors that are available for processing the received client identification numbers. Alternatively, in another example, the number of virtual processors that are available can also depend on the number of cores available within the physical processor 202. By way of example, FIG. 5 illustrates three virtual processors, i.e., virtual processor 1, virtual processor 2, and virtual processor 3 that are available for processing the received client identification numbers.

In step 320, the database management system 104 determines if the identified current number of virtual processors that are available is greater than or equal to the required number of virtual processors to process the received client identification numbers. Accordingly, if the database management system 104 determines that the identified current number of virtual processors is not greater than or equal to the required number of virtual processors, the No branch is taken to step 325.

Figure 6:
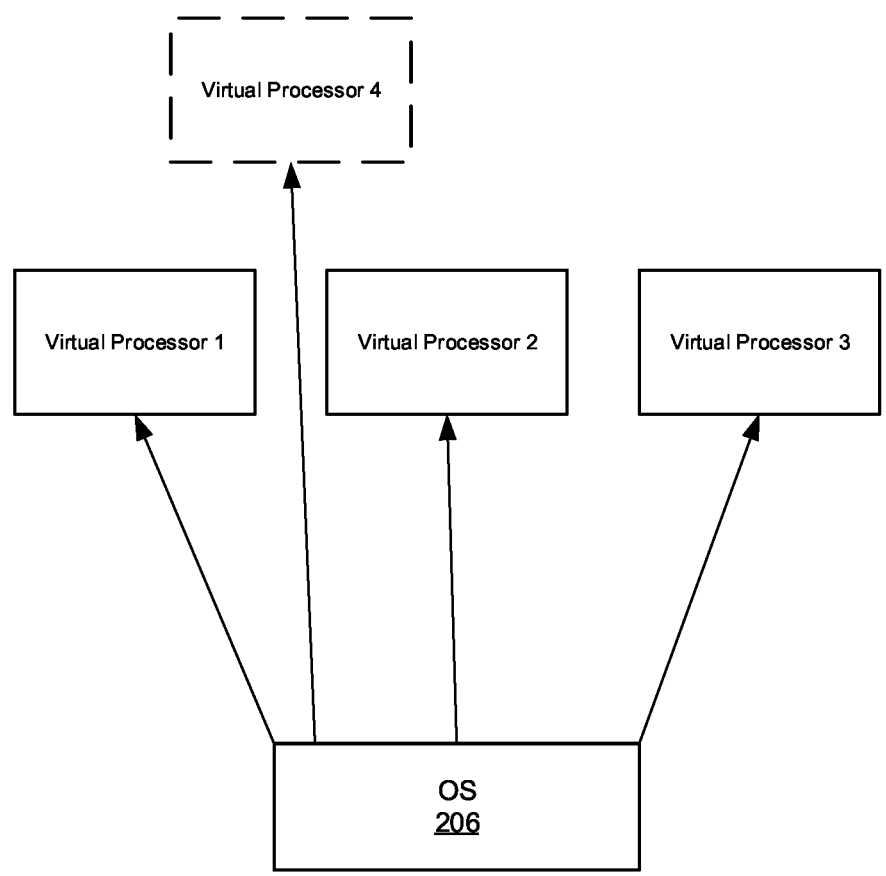
FIG. 6 is an exemplary block diagram illustrating a virtual processor, according to an example implementation of the disclosed technology.

In step 325, the database management system 104 creates new virtual processors. In this example, the number of newly created virtual processors can be the difference between the number of available virtual processors to the available to the number of virtual processors that are required to process the received client identification numbers. Although, in other examples, the number of virtual processors that are created can depend on the type of the physical processor 202 and/or the number of cores present within the physical processor 202. By way of example, as illustrated in FIG. 6, the database management system 104 can create one new virtual processor, i.e., virtual processor 4 if the number of virtual processors required is four and the number of available virtual processors is 3.

However, back in step 320, if the database management system 104 determines that the identified current number of virtual processors is greater than or equal to the required number of virtual processors, then the Yes branch is taken to step 330. For example, if the number of required virtual processors is three (3) and the number of available virtual processors is also three (3), then the Yes branch is taken to step 330.

In step 330, the database management system 104 divides the received plurality of client tracking numbers and assigns to the available virtual processors. In this example, the database management system 104 can equally divide the received client tracking numbers between the available virtual processors, although the database management system 104 can divide the received client tracking numbers based on the processing capacity of the available virtual processors in other examples. For example, if there are eight (8) client records that are received and if there are four (4) virtual processors available, then the database management system 104 can assign two client records for each of the virtual processor. In another example, if there are 8 client records and four (4) virtual processors out of which three virtual processors are fully available to process the client records and the fourth virtual processor is only partially available, then the database management system 104 can assign three (3) client records to one of the virtual processors, two client records for the other two virtual processors, and one client record to the virtual processor that is partially available to process the client record.

In step 335, the virtual processors within the database management system 104 retrieves the client record data associated with the client identification numbers that were assigned to the virtual processors from a database (not shown) within the memory 204, although the database management system 104 can retrieve the client records from other locations. In this example, the client records that are retrieved can include data associated with a client in stored in a table including of rows and columns, although the client records can be represented in other formats. In this example, each client identification number is associated with one client record data, although multiple client identification numbers can be associated with a single client record data or vice-versa in other examples.

In step 340, the virtual processor within the database management system 104 encrypts or decrypts the retrieved client record data depending on the current format (encrypted or decrypted) of the client record data. For example, if the retrieved client record data is decrypted, then the virtual processor that is assigned to the retrieved client record data encrypts the client record data. On the other hand, if the retrieved client record data is encrypted, then the virtual processor that is assigned to the retrieved client record data decrypts the client record data.

In step 345, the operating system 206 within the database management system 104 determines if there is an error or a fault that has occurred causing the virtual processor that is either encrypting or decrypting the client record to enter a shutdown or restart state by any one of the virtual processors. In this example, the error or the fault can be a result of power failure, execution of a troublesome code, issue with the operating system kernel, or device drivers, although the error or the fault can be a result of other types of parameters. Accordingly, if the database management system 104 determines that there has been an error, then the Yes branch is taken to step 350.

In step 350, the operating system 206 within the database management system 104 identifies a new virtual processor to resume the encrypting or decrypting of the client record(s) that was associated with the virtual processor that encountered the error. In this example, the identified new virtual processor can be an existing virtual processor that has the capacity to process the client record by encrypting or decrypting the client record or can be a newly created virtual processor by the operation system 206. Furthermore, the newly identified virtual processor can either resume encrypting or decrypting from where the error occurred in virtual processor or can start over from the beginning.

In step 355, the database management system 104 updates the database (e.g., credit database) with all the updated (encrypted or decrypted) client record data and the exemplary method ends.

Referring again to the system environment 100 described in FIG. 1, the issuer system 102 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the issuer system 102 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the issuer system 102 can contain an operating system ("OS") 116 that can run one or more programs 118. The one or more programs 118 can perform one or more functions of the disclosed examples. The one or more programs 118 can include, for example, a program for accessing off-chain data and allocating pair values to the tokenized rewards and tokenized points. The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The issuer system 102 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 122 can include a transceiver 124 to communicate with compatible devices, for example via short range, long range (e.g., cellular, local area networks (LAN), wide area networks (WAN), etc.), or similar technologies that enables the issuer system 102 to communicate via the network 110 described herein.

The transaction system 106 can include similar components as described for the issuer system 102. For example, the transaction system 106 can include a processor 132, memory 134, an OS 136, one or more programs 138, and data storage via a database 140, which can be similar to processor 112, memory 114, OS 116, program 118, and database 120, respectively. Further, the transaction system 106 can include a PoS device 130. The PoS device 130 can be an electronic fund transfer terminal that accepts payments via a credit card via a magnetic stripe and/or via contactless payment. The PoS device 130 can also be a backend system that receives transaction requests from a customer and transfers information to the issuer system 102.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Exemplary Use Case

The following example use case describes an example of a typical user flow pattern. This section is intended solely for explanatory purposes and not in limitation.

In one example, the database management system 104 receives client identification numbers similar to the ones illustrated in FIG. 4 from a client identification number database (not shown). For the ten client identification numbers, the database management system 104 determines the required number of virtual processor to process the received client identification numbers, which in this example will be four. Additionally, the database management system 104 identifies a current number of virtual processors, i.e., three virtual processors (virtual processor 1, virtual processor 2, and virtual processor 3) that are available for processing the received client identification numbers. Next, the database management system 104 determines if the current number of virtual processors is greater than or equal to the required number of virtual processors to process the received ten client identification numbers. In this example, the number of currently available virtual processors, i.e., three virtual processors, is less than the required number of virtual processors, i.e., four. Accordingly, a new virtual processor, i.e., virtual processor 4, is created as illustrated in FIG. 6. Further, the database management system 104 divides the received ten client tracking numbers and assigns to the available virtual processors. In this example, the database management system 104 can equally divide the received client tracking numbers between the available virtual processors, i.e., if there are eight (8) client records that are received and if there are four (4) virtual processors available, then the database management system 104 can assign two client records for each of the virtual processor. Next, the database management system 104 obtains client record data associated with the client identification numbers that were assigned to the virtual processors from a database (not shown) within the memory 204. Further, the database management system 104 encrypts or decrypts the retrieved client record data depending on the current format (encrypted or decrypted) of the client record data. For example, if the retrieved client record data is decrypted, then the virtual processor that is assigned to the retrieved client record data encrypts the client record data. On the other hand, if the retrieved client record data is encrypted, then the virtual processor that is assigned to the retrieved client record data decrypts the client record data. While encrypting or decrypting, the database management system 104 determines if there is an error or a fault such as power failure, execution of a troublesome code, issue with the operating system kernel, or device drivers. For example, if the virtual processor 3 encounters an error while encrypting the client identification numbers, the database management system 104 identifies virtual processor 4 as the newly available virtual processor to continue to the encryption. Finally, the database management system 104 updates the database with the encrypted or decrypted client records.

Examples of the present disclosure can be implemented according to at least the following clauses:

Clause 1: A system for performing stream-based database alteration, the system comprising: one or more processors; and memory in communication with the one or more processors and storing instructions that, when executed by the one or more processors, are configured to cause the system to: receive a plurality of client tracking identification numbers in a data stream from a database via a communication network in a JavaScript Object Notation (JSON) format, wherein the plurality of client tracking identification numbers comprises customer metadata; determine a required number of one or more virtual consumer processors to encrypt or decrypt a client record associated with each of the received plurality of client tracking identification numbers; identify a current number of one or more available virtual consumer processors to encrypt or decrypt the client record associated with each of the received plurality of client tracking identification numbers; and when the identified current number of one or more available virtual consumer processors is greater than or equal to the required number of the one or more virtual consumer processors: divide the received plurality of client tracking identification numbers and assign the divided received plurality of client tracking identification numbers between the one or more available virtual consumer processors, based on an operating capacity of the one or more available virtual consumer processors; retrieve the client record associated with each of the plurality of client tracking identification numbers from a client database; encrypt or decrypt the retrieved client record in the client database using the assigned one or more available virtual consumer processors; and update the database to indicate the client record associated with each of the plurality of client tracking identification numbers is encrypted or decrypted using the assigned one or more available virtual consumer processors.

Clause 2: The system of clause 2, wherein the instructions, when executed by the one or more processors, are further configured to cause the system to, create one or more new virtual consumer processors when the identified current number of one or more available virtual consumer processors is less than the required number of the one or more virtual consumer processors.

Clause 3: The system of clause 1, wherein the instructions, when executed by the one or more processors, are further configured to cause the system to, delete the one or more available virtual consumer processors upon updating the database to indicate the client record associated with each of the plurality of client tracking identification numbers is encrypted or decrypted using the assigned one or more available virtual consumer processors.

Clause 4: The system of clause 1, wherein the instructions, when executed by the one or more processors, are further configured to cause the system to, determine when there is an error from the assigned one or more available virtual consumer processors during the encrypting or decrypting the retrieved client record in the client database.

Clause 5: The system of clause 4, wherein the instructions, when executed by the one or more processors, are further configured to cause the system to: identify one or more existing available virtual consumer processors for encrypting or decrypting the retrieved client record in the client database when the error is determined; and assign the identified one or more existing available virtual consumer processors for encrypting or decrypting the retrieved client record in the client database.

Clause 6: The system of clause 4, wherein the instructions, when executed by the one or more processors, are further configured to cause the system to: create one or more new virtual consumer processors for encrypting or decrypting the retrieved client record in the client database when the error is determined; and assign the created one or more new virtual consumer processors for encrypting or decrypting the retrieved client record in the client database.

Clause 7: A system for performing stream-based database alteration, the system comprising: one or more processors; and memory in communication with the one or more processors and storing instructions that, when executed by the one or more processors, are configured to cause the system to: assign a plurality of received client tracking identification numbers to one or more available virtual consumer processors for encrypting or decrypting a client record associated with each of the plurality of received client tracking identification numbers, based on operating capacity of the one or more available virtual consumer processors;
  determine whether there is an error from the assigned one or more available virtual consumer processors during the encrypting or decrypting of the client record associated with each of the plurality of received client tracking identification numbers; when the error is determined from the assigned one or more available virtual consumer processors during the encrypting or decrypting of the client record associated with each of the plurality of received client tracking identification numbers: identify at least one new virtual consumer processor to assign the encrypting or decrypting of the client record associated with each of the plurality of received client tracking identification numbers; assign the encrypting or decrypting of the client record associated with each of the plurality of received client tracking identification numbers to the identified at least one new virtual consumer processor; complete the encrypting or decrypting of the client record associated with each of the plurality of received client tracking identification numbers using the assigned at least one new virtual consumer processor; and
  update a database to indicate the client record associated with each of the plurality of received client tracking identification numbers is encrypted or decrypted using the assigned at least one new virtual consumer processor.

Clause 8: The system of clause 7 wherein the instructions, when executed by the one or more processors, are further configured to cause the system to, receive the received plurality of client tracking identification numbers in a data stream from a database via a communication network, wherein the plurality of received client tracking identification numbers comprises customer metadata.

Clause 9: The system of clause 7 wherein the identified at least one new virtual consumer processor is a newly created virtual consumer processor to encrypt or decrypt the client record associated with each of the plurality of received client tracking identification numbers.

Clause 10: The system of clause 7 wherein the identified at least one new virtual consumer processor is an existing virtual consumer processor with an operating capacity to encrypt or decrypt the client record associated with each of the plurality of received client tracking identification numbers.

Clause 11: The system of clause 7 wherein the instructions, when executed by the one or more processors, are further configured to cause the system to, assign the at least one new virtual consumer processor to encrypt or decrypt another client record associated with a plurality of different client tracking identification numbers upon updating the database to indicate the client record associated with each of the plurality of different client tracking identification numbers is encrypted or decrypted.

Clause 12: The system of clause 7 wherein the instructions, when executed by the one or more processors, are further configured to cause the system to, delete the at least one new virtual consumer processor to encrypt or decrypt another client record associated with a plurality of different client tracking identification numbers upon updating the database to indicate the client record associated with each of the plurality of different client tracking identification numbers is encrypted or decrypted.

Clause 13: A system for performing stream-based database alteration, the system comprising: one or more processors; and memory in communication with the one or more processors and storing instructions that, when executed by the one or more processors, are configured to cause the system to: receive a plurality of client tracking identification numbers in a data stream from a database via a communication network, wherein the plurality of client tracking identification numbers comprises customer metadata; assign the received plurality of client tracking identification numbers to one or more virtual consumer processors for encrypting or decrypting a client record associated with each of the plurality of received client tracking identification numbers; encrypt or decrypt the client record associated with each of the received plurality of client tracking identification numbers; and update a database to indicate the client record associated with each of the received plurality of client tracking identification numbers is encrypted or decrypted using the assigned one or more virtual consumer processors.

Clause 14: The system of clause 13 wherein the instructions, when executed by the one or more processors, are further configured to cause the system to: determine a required number of the one or more virtual consumer processors to encrypt or decrypt the client record associated with each of the received plurality of client tracking identification numbers; and identify a current number of one or more available virtual consumer processors to encrypt or decrypt the client record associated with the received plurality of client tracking identification numbers.

Clause 15: The system of clause 14 wherein the instructions, when executed by the one or more processors, are further configured to cause the system to, responsive to determining that the identified current number of one or more available virtual consumer processors is greater than or equal to the required number of the one or more virtual consumer processors: divide the received plurality of client tracking identification numbers and assign the divided received plurality of client tracking identification numbers between the one or more virtual consumer processors, based on an operating capacity of the one or more virtual consumer processors; retrieve the client record associated with each of the plurality of client tracking identification numbers from a client database; encrypt or decrypt the retrieved client record in the client database using the assigned one or more virtual consumer processors; and update the database to indicate the client record associated with each of the plurality of client tracking identification numbers is encrypted or decrypted using the assigned one or more virtual consumer processors.

Clause 16: The system of clause 14 wherein the instructions, when executed by the one or more processors, are further configured to cause the system to, responsive to determining that the identified current number of one or more available consumer processors is less than the required number of the one or more virtual consumer processors, create one or more new virtual consumer processors to encrypt or decrypt the client record associated with each of the plurality of client tracking identification numbers.

Clause 17: The system of clause 13 wherein the instructions, when executed by the one or more processors, are further configured to cause the system to, determine whether there is an error from the assigned one or more virtual consumer processors during the encrypting or decrypting of the client record associated with each of the plurality of received client tracking identification numbers.

Clause 18: The system of clause 17 wherein the instructions, when executed by the one or more processors, are further configured to cause the system to, responsive to determining the error from the assigned one or more virtual consumer processors: identify at least one new virtual consumer processor to assign the encrypting or decrypting of the client record associated with each of the plurality of received client tracking identification numbers;

assign the encrypting or decrypting of the client record associated with each of the plurality of received client tracking identification numbers to the identified at least one new virtual consumer processor; complete the encrypting or decrypting of the client record associated with each of the plurality of received client tracking identification numbers using the assigned at least one new virtual consumer processor; and update a database to indicate the client record associated with each of the plurality of client tracking identification numbers is encrypted or decrypted using the assigned at least one new virtual consumer processor.

Clause 19: The system of clause 18 wherein the identified at least one new virtual consumer processor is a newly created virtual consumer processor to encrypt or decrypt the client record associated with each of the plurality of received client tracking identification numbers.

Clause 20: The system of clause 18 wherein the identified at least one new virtual consumer processor is an existing virtual consumer processor with an operating capacity to encrypt or decrypt the client record associated with each of the plurality of received client tracking identification numbers.

What is claimed is:

1. A system for performing stream-based database alteration, the system comprising:
    one or more processors; and
    memory in communication with the one or more processors and storing instructions that, when executed by the one or more processors, are configured to cause the system to:
        receive a plurality of client tracking identification numbers in a data stream from a database via a communication network in a JavaScript Object Notation (JSON) format, wherein the plurality of client tracking identification numbers comprises customer metadata;
        determine a required number of one or more virtual consumer processors to encrypt or decrypt a client record associated with each of the received plurality of client tracking identification numbers;
        identify a current number of one or more available virtual consumer processors to encrypt or decrypt the client record associated with each of the received plurality of client tracking identification numbers; and
        when the identified current number of one or more available virtual consumer processors is greater than or equal to the required number of the one or more virtual consumer processors:
            divide the received plurality of client tracking identification numbers and assign the divided received plurality of client tracking identification numbers between the one or more available virtual consumer processors, based on an operating capacity of the one or more available virtual consumer processors;
            retrieve the client record associated with each of the plurality of client tracking identification numbers from a client database;
            encrypt or decrypt the retrieved client record in the client database using the assigned one or more available virtual consumer processors; and
            update the database to indicate the client record associated with each of the plurality of client tracking identification numbers is encrypted or decrypted using the assigned one or more available virtual consumer processors.

2. The system of claim 1, wherein the instructions, when executed by the one or more processors, are further configured to cause the system to:
    create one or more new virtual consumer processors when the identified current number of one or more available virtual consumer processors is less than the required number of the one or more virtual consumer processors.

3. The system of claim 1, wherein the instructions, when executed by the one or more processors, are further configured to cause the system to:
    delete the one or more available virtual consumer processors upon updating the database to indicate the client record associated with each of the plurality of client tracking identification numbers is encrypted or decrypted using the assigned one or more available virtual consumer processors.

4. The system of claim 1, wherein the instructions, when executed by the one or more processors, are further configured to cause the system to:
    determine when there is an error from the assigned one or more available virtual consumer processors during the encrypting or decrypting the retrieved client record in the client database.

5. The system of claim 4, wherein the instructions, when executed by the one or more processors, are further configured to cause the system to:
    identify one or more existing available virtual consumer processors for encrypting or decrypting the retrieved client record in the client database when the error is determined; and assign the identified one or more existing available virtual consumer processors for encrypting or decrypting the retrieved client record in the client database.

6. The system of claim 4, wherein the instructions, when executed by the one or more processors, are further configured to cause the system to:
create one or more new virtual consumer processors for encrypting or decrypting the retrieved client record in the client database when the error is determined; and
assign the created one or more new virtual consumer processors for encrypting or decrypting the retrieved client record in the client database.

7. A system for performing stream-based database alteration, the system comprising:
one or more processors; and
memory in communication with the one or more processors and storing instructions that, when executed by the one or more processors, are configured to cause the system to:
assign a plurality of received client tracking identification numbers to one or more available virtual consumer processors for encrypting or decrypting a client record associated with each of the plurality of received client tracking identification numbers, based on operating capacity of the one or more available virtual consumer processors;
determine whether there is an error from the assigned one or more available virtual consumer processors during the encrypting or decrypting of the client record associated with each of the plurality of received client tracking identification numbers; and
when the error is determined from the assigned one or more available virtual consumer processors during the encrypting or decrypting of the client record associated with each of the plurality of received client tracking identification numbers:
identify at least one new virtual consumer processor to assign the encrypting or decrypting of the client record associated with each of the plurality of received client tracking identification numbers;
assign the encrypting or decrypting of the client record associated with each of the plurality of received client tracking identification numbers to the identified at least one new virtual consumer processor;
complete the encrypting or decrypting of the client record associated with each of the plurality of received client tracking identification numbers using the assigned at least one new virtual consumer processor; and
update a database to indicate the client record associated with each of the plurality of received client tracking identification numbers is encrypted or decrypted using the assigned at least one new virtual consumer processor.

8. The system of claim 7 wherein the instructions, when executed by the one or more processors, are further configured to cause the system to:
receive the received plurality of client tracking identification numbers in a data stream from a database via a communication network, wherein the plurality of received client tracking identification numbers comprises customer metadata.

9. The system of claim 7 wherein the identified at least one new virtual consumer processor is a newly created virtual consumer processor to encrypt or decrypt the client record associated with each of the plurality of received client tracking identification numbers.

10. The system of claim 7 wherein the identified at least one new virtual consumer processor is an existing virtual consumer processor with an operating capacity to encrypt or decrypt the client record associated with each of the plurality of received client tracking identification numbers.

11. The system of claim 7 wherein the instructions, when executed by the one or more processors, are further configured to cause the system to:
assign the at least one new virtual consumer processor to encrypt or decrypt another client record associated with a plurality of different client tracking identification numbers upon updating the database to indicate the client record associated with each of the plurality of different client tracking identification numbers is encrypted or decrypted.

12. The system of claim 7 wherein the instructions, when executed by the one or more processors, are further configured to cause the system to:
delete the at least one new virtual consumer processor to encrypt or decrypt another client record associated with a plurality of different client tracking identification numbers upon updating the database to indicate the client record associated with each of the plurality of different client tracking identification numbers is encrypted or decrypted.

13. A system for performing stream-based database alteration, the system comprising:
one or more processors; and
memory in communication with the one or more processors and storing instructions that, when executed by the one or more processors, are configured to cause the system to:
receive a plurality of client tracking identification numbers in a data stream from a database via a communication network, wherein the plurality of client tracking identification numbers comprises customer metadata;
determine a required number of one or more virtual consumer processors to encrypt or decrypt a client record associated with each of the received plurality of client tracking identification numbers;
identify a current number of one or more available virtual consumer processors to encrypt or decrypt the client record associated with the received plurality of client tracking identification numbers;
assign the received plurality of client tracking identification numbers to the one or more available virtual consumer processors for encrypting or decrypting the client record associated with each of the plurality of received client tracking identification numbers;
encrypt or decrypt the client record associated with each of the received plurality of client tracking identification numbers; and
update a database to indicate the client record associated with each of the received plurality of client tracking identification numbers is encrypted or decrypted using the assigned one or more virtual consumer processors.

14. The system of claim 13 wherein the instructions, when executed by the one or more processors, are further configured to cause the system to:
responsive to determining that the identified current number of one or more available virtual consumer processors is greater than or equal to the required number of the one or more virtual consumer processors:

divide the received plurality of client tracking identification numbers and assign the divided received plurality of client tracking identification numbers between the one or more virtual consumer processors, based on an operating capacity of the one or more virtual consumer processors;

retrieve the client record associated with each of the plurality of client tracking identification numbers from a client database;

encrypt or decrypt the retrieved client record in the client database using the assigned one or more virtual consumer processors; and update the database to indicate the client record associated with each of the plurality of client tracking identification numbers is encrypted or decrypted using the assigned one or more virtual consumer processors.

15. The system of claim 13 wherein the instructions, when executed by the one or more processors, are further configured to cause the system to:

responsive to determining that the identified current number of one or more available consumer processors is less than the required number of the one or more virtual consumer processors, create one or more new virtual consumer processors to encrypt or decrypt the client record associated with each of the plurality of client tracking identification numbers.

16. The system of claim 13 wherein the instructions, when executed by the one or more processors, are further configured to cause the system to:

determine whether there is an error from the assigned one or more virtual consumer processors during the encrypting or decrypting of the client record associated with each of the plurality of received client tracking identification numbers.

17. The system of claim 16 wherein the instructions, when executed by the one or more processors, are further configured to cause the system to:

responsive to determining the error from the assigned one or more virtual consumer processors:

identify at least one new virtual consumer processor to assign the encrypting or decrypting of the client record associated with each of the plurality of received client tracking identification numbers;

assign the encrypting or decrypting of the client record associated with each of the plurality of received client tracking identification numbers to the identified at least one new virtual consumer processor;

complete the encrypting or decrypting of the client record associated with each of the plurality of received client tracking identification numbers using the assigned at least one new virtual consumer processor; and update a database to indicate the client record associated with each of the plurality of client tracking identification numbers is encrypted or decrypted using the assigned at least one new virtual consumer processor.

18. The system of claim 17 wherein the identified at least one new virtual consumer processor is a newly created virtual consumer processor to encrypt or decrypt the client record associated with each of the plurality of received client tracking identification numbers.

19. The system of claim 17 wherein the identified at least one new virtual consumer processor is an existing virtual consumer processor with an operating capacity to encrypt or decrypt the client record associated with each of the plurality of received client tracking identification numbers.

* * * * *